(12) United States Patent  
Poitras et al.

(10) Patent No.: US 7,520,457 B1
(45) Date of Patent: Apr. 21, 2009

(54) AUTOMATED COMPOSTING SYSTEM

(76) Inventors: Brian Poitras, 12 Autran Ave., N. Andover, MA (US) 01845; Robert F. Moglia, 24 Scotland Ave., Salem, NH (US) 03079

( * ) Notice: Subject to any disclaimer, the term of this patent is extended or adjusted under 35 U.S.C. 154(b) by 751 days.

(21) Appl. No.: 10/814,308

(22) Filed: Mar. 31, 2004

Related U.S. Application Data

(60) Provisional application No. 60/459,172, filed on Mar. 31, 2003.

(51) Int. Cl.
C12M 1/02 (2006.01)
(52) U.S. Cl. ............... 241/101.2; 435/290.1; 435/290.2
(58) Field of Classification Search ... 435/290.1–290.4; 241/101.2
See application file for complete search history.

(56) References Cited

U.S. PATENT DOCUMENTS

| | | | |
|---|---|---|---|
| 3,245,759 A * | 4/1966 | Eweson ...................... 422/210 |
| 3,845,939 A | 11/1974 | Waldenville |
| 3,930,799 A | 1/1976 | Eweson |
| 4,230,282 A * | 10/1980 | Haase ........................ 241/159 |
| 4,586,659 A | 5/1986 | Easter, II |
| 4,752,038 A * | 6/1988 | Takahashi et al. .......... 241/158 |
| 5,049,486 A | 9/1991 | Blackwood et al. |
| H1149 H | 3/1993 | Wyman et al. |
| 5,292,637 A | 3/1994 | Bohnensieker |
| 5,407,809 A | 4/1995 | Finn |
| 5,559,033 A | 9/1996 | Young |
| 5,584,904 A | 12/1996 | Dalos |
| 5,587,320 A | 12/1996 | Shindo et al. |
| 5,591,635 A * | 1/1997 | Young et al. ............. 435/286.1 |
| 5,661,031 A | 8/1997 | Murphy et al. |
| 5,710,042 A | 1/1998 | Shindo et al. |
| 5,766,935 A | 6/1998 | Seagren |
| 5,866,409 A | 2/1999 | Nibu |
| 5,925,561 A | 7/1999 | Posselius, Jr. et al. |
| 5,945,332 A | 8/1999 | Fors |
| 6,024,312 A * | 2/2000 | Spiesshofer ................. 241/166 |
| 6,058,822 A * | 5/2000 | Parke ........................ 83/425.2 |
| 6,071,740 A | 6/2000 | Kerouac |
| 6,352,855 B1 | 3/2002 | Kerouac |
| 6,399,366 B1 | 6/2002 | Seagren |

OTHER PUBLICATIONS

AEC, Inc. Nelmor, "SH Series Shredders and Shredder / Granulators", product brochure, Copyright 1999, AEC, Inc., North Uxbridge, MA, USA.

* cited by examiner

*Primary Examiner*—Shelley Self
(74) *Attorney, Agent, or Firm*—O'Connell Law Firm (57) ABSTRACT

A composting system with a digestion chamber, an auger shaft with at least one mixing vane, and a power unit. The power unit can be hydraulic and can also power a shredding unit and an input conveyor system. A barrier wall can be interposed between those elements and the digestion chamber. The digestion chamber can be divided into subchambers, and sequentially lower apertures can promote a progression of organic material. A malfunction sensor can sense a malfunction of the auger shaft, the shredding unit, or another component. A malfunction report can be provided, including to a remote receiver. The report can include a determined location of the composting system and can be directed to a selected receiver based on the malfunction. Fluids, including gasses and liquids, can be introduced by a supply source in combination with apertures along the auger shaft and/or a mixing vane.

34 Claims, 5 Drawing Sheets

AUTOMATED COMPOSTING SYSTEM

This application claims the benefit of Provisional Application 60/459,172 filed Mar. 31, 2003

FIELD OF THE INVENTION

The invention described herein relates generally to composting systems and methods. More particularly, this patent discloses and protects a system and method for automatically composting refuse.

BACKGROUND OF THE INVENTION

For a plurality of reasons, the composting of solid waste has proven to be a desirable practice in residential and business applications. During composting, organic matter that would otherwise be added to already overburdened and overflowing landfills is decayed and decomposed into a usable mixture of lower volume and weight that can be reused advantageously in a number of useful endeavors including the fertilization and conditioning of land. As such, composting can be employed to convert materials that would otherwise pose as a nuisance presenting difficulties in handling, transportation, and disposal into a beneficial and potentially valuable end product. For example, compost can be used to great advantage in residential, commercial, and municipal applications. It can be used alone as environmentally safe land fill and cover, as mulch, and in combination with traditional soil to improve the performance characteristics of the soil.

As one would expect, therefore, the prior art has disclosed a wide variety of methods and apparatuses for composting solid organic waste. Composting apparatuses have varied from simple barrel constructions for personal and home use, to tractor-trailer sized composting units for commercial applications, to complete facilities for municipal composting. These structures and methods have contributed usefully to establish the present state of the art in composting.

The speed and effectiveness of the bacterial processes required for the decomposition of solid wastes are affected by a plurality of factors. Certain more advanced and complex composting arrangements have sought to exercise at least some degree of control over one or more of those factors. For example, many prior art disclosures have suggested that decomposition can be accelerated by ensuring that a 'seed colony' of bacteria is provided for facilitating a rapid beginning of the bacterial processes. Accordingly, many prior art systems and methods teach the consistent retention of at least a small portion of decomposed matter for being intermingled with incoming waste material.

Additionally, it has been found that solid waste decomposition is affected by the size of the particles to be digested. With that, certain prior art composting systems incorporate shredding or grinding means for reducing particles to a more readily decomposed size. Still further, it is known that certain desired decomposition processes are aerobic in nature. Therefore, for most effective decomposition throughout a volume of solid waste, the waste ideally will be aerated in some periodic manner. Some methods and systems carry out this aeration in whole or in part by injecting air into the volume of solid waste while others provide thorough aeration while also ensuring a relatively homogenous mixture of material by stirring the volume of material periodically. In many prior art arrangements, the stirring is carried out by rotating the compost container, which is typically cylindrical and often includes mixing baffles, such that the volume of waste material tumbles about thereby become generally mixed and aerated. Another known aeration and mixing technique is to provide an agitating rod, possibly with paddles or the like extending therefrom, that is rotatable within a normally cylindrical compost container.

Decomposition will occur over what is termed a mesophyllic range, which is typically from about 70 degrees Fahrenheit to about 105 degrees Fahrenheit, where mesophyllic bacteria are active. However, it is known that the initial stage of decomposition is carried out most effectively over a thermophilic range, which normally is from about 120 degrees Fahrenheit to about 150 degrees Fahrenheit, which is primarily dependent on thermophilic microorganisms. As the waste material transitions from mesophyllic to thermophilic temperatures, mesophyllic bacteria populations are replaced by thermophilic populations. In the latter stages of decomposition, the waste material normally cools to the mesophyllic range, and mesophyllic organisms again operate.

Advantageously, most pathogens are killed during the thermophilic stage when it rises above approximately 130 degrees Fahrenheit. Such elevated temperatures normally occur naturally as a byproduct of the heat that is generated during decomposition. If, however, ambient temperatures are excessively low or if the compost container is substantially incapable of retaining heat, then achieving suitably elevated temperatures may require the addition of heat or the provision of insulation relative to the compost container.

The composting systems and methods that have been designed for commercial applications have undeniably contributed usefully to the present state of the art. Unfortunately, however, prior art composting arrangements have suffered from a variety of disadvantages and shortcomings that have caused most proposed methods and systems to be inefficient and unworkable in practice. As such, most have remained primarily theoretical in nature, never achieving widespread or even substantial usage.

One major issue that has adversely affected the effectiveness and utility of prior art commercial composting systems is a noted inability to achieve full mixing of the retained waste material. For example, the rudimentary tumbling motion of rotating composters often fails to separate and mix the material to be composted. Similarly, the mixing blades on the rotating shafts of such composting units by their very nature fail to make widespread contact with the material to be composted.

Furthermore, a great majority of prior art composting systems, including those disclosed and protected by U.S. Pat. Nos. 6,071,740 and 6,352,855 to Kerouac, demand that a large composting drum, heavy when taken alone but particularly heavy when loaded with organic material, be rotated to achieve a mixing and progression of organic material. Such structures are notably inefficient not only with respect to mixing but also in relation to energy consumption. Just as notably, the need for rotating a large, heavy drum inherently requires complex and heavily built support and rotation arrangements. Such arrangements are inherently complex in construction and operation. Furthermore, they are prone to failure and difficult to repair. Even further, failures in such systems commonly require extended time for repair during which the devices unavailable for composting.

A further shortcoming that has hindered the success of composting systems of the prior art, particularly commercial-type composters, is that malfunctions commonly occur that are unknown to or irremediable by the operator. For example, much of the operating machinery within the composter, such as any shredder mechanism that might be in use and any rotatable components, is obscured from the operator's view. As a result, further material to be composted can be fed into a system that is already obstructed or otherwise disabled. Furthermore, most commercial-type composters are designed with a relatively high degree of complexity and expertise but are operated by persons with little or no expertise, which can often be combined with at least some degree of apathy. As such, an operator might entirely ignore, underestimate, or be completely unaware of a jammed or disabled shredder or other component of the composting system thereby leading to further damage to the system, increased difficulty of repair, and a compromised composting process.

In light of these and further disadvantages of prior art composting systems and methods, including their relative complexity and other design shortcomings, it is clear that there remains a need for an improved composting system and method that overcomes one or more of the disadvantages of the prior art. It is clearer still that a composting system and method that provides a solution to each of the abovedescribed disadvantages while demonstrating enhanced effectiveness and utility would represent a marked advance in the art.

SUMMARY OF THE INVENTION

Advantageously, the present invention is founded on the basic object of providing a composting system and method that overcomes each of the described disadvantages that have been demonstrated by the prior art while providing a number of heretofore unrealized advantages thereover.

A related object of the invention is to provide a composting system and method that is capable of operating efficiently and substantially autonomously such that it can reach beyond the theoretical to achieve widespread and substantial usage.

A further object of the invention is to provide a composting system and method that consistently achieves a full and effective mixing and aeration of retained waste material.

Yet another object of the invention is to provide a composting system and method that minimizes the detrimental effects of system malfunctions.

A related object of the invention is to provide a composting system and method that enables the expedient repair or other remediation of system malfunctions with little or no required operator intervention or knowledge.

A further object of particular embodiments of the invention is to provide a composting system and method that supplies a notification of malfunction to a machine operator and, in particularly preferred embodiments, to remotely located repair personnel to enable rapid response and remediation of system malfunctions.

These and in all likelihood further objects and advantages of the present invention will become obvious not only to one who reviews the present specification and drawings but also to those who experience an embodiment of the automated composting system disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth these objects, one embodiment of the present invention for a composting system is founded on a digestion chamber, which can be fixedly retained within a shell housing, that has an input aperture for receiving organic material to be composted, a body portion, and an exhaust aperture for enabling an exhaust of composted organic material. An auger shaft can be rotatably retained relative to the digestion chamber, and at least one mixing vane can project radially from the auger shaft for mixing organic material within the chamber. The auger shaft can be rotated by any effective means.

In one embodiment, the auger shaft can be rotated by a hydraulic auger motor that is powered by a hydraulic power unit thereby creating a durable and compact, yet powerful, drive arrangement. Advantageously, the hydraulic power unit can additionally be employed to power a hydraulic shredding motor that operates a hydraulic shredding unit for reducing the particle size of organic material to be composted. Still further, the hydraulic power unit can be employed to power a hydraulic input conveyor mechanism through a hydraulic input conveyor motor to convey material from the shredding unit into the digestion chamber.

The power unit, the auger motor, the shredding unit, the shredding motor, the input conveyor mechanism, the input conveyor motor, and a control system can all be disposed adjacent to an input end of the digestion chamber such that all power and control of the composting system can be disposed at a single end of the digestion chamber. In certain embodiments, a barrier wall can be interposed between the digestion chamber and the aforementioned components to insulate the same from the heat, moisture, and other potentially adverse environmental conditions inherent in the composting process.

To facilitate a progressive composting process, the digestion chamber can be subdivided into a plurality of subchambers by at least one divider wall. In such a case, the auger shaft will likely be disposed through each of the plurality of subchambers. First and second divider walls can divide the digestion chamber into primary, secondary, and tertiary subchambers, and first and second intermediate apertures can be disposed in the respective divider walls for enabling a passage of organic material from subchamber to subchamber. To promote a sequential progression of organic material, the input aperture, the first intermediate aperture, the second intermediate aperture, and the exhaust aperture can sequentially decrease in effective height. A temperature sensor and, possibly, a heating element can be operably associated with one or all of the subchambers to enable the subchamber or subchambers to be maintained in a desired temperature condition, such as in the mesophyllic or thermophilic temperature ranges.

Plural mixing vanes can be retained relative to the auger shaft relative to each subchamber. The plural mixing vanes in each subchamber can have axial portions that cooperate to provide a substantially constant mixing surface, which can have angular spaces between mixing vanes. The mixing surface will preferably be immediately adjacent to an inner wall surface of the digestion chamber over an entire length of the respective subchamber. With this, it can be ensured that all organic material within the subchamber is mixed with each revolution of the auger shaft. One or more vents, each possibly including a fan, can be associated with each of the subchambers for enabling an ingress or egress of gasses relative to the subchamber.

Under certain constructions of the composting system, at least one malfunction sensor can be incorporated for sensing a malfunction of the composting system. For example, a malfunction sensor can be operably associated with the auger shaft for sensing a malfunction of the auger shaft, operably associated with the shredding unit for sensing a malfunction of the shredding unit, and/or operably associated with any other component of the composting system for sensing a malfunction thereof. A malfunction report, which can comprise a mere positive indication or a detailed report, can be provided relative to the composting system and/or relative to a remotely located receiver. Furthermore, the composting system can incorporate a means for determining a location of the composting system, such as a global positioning device, and the malfunction report can include an indication of the location of the composting system. Even further, the means for communicating a malfunction report can contact one or more particular receivers based on the type of malfunction sensed. For example, where a malfunction of the shredding unit is sensed, shredder repair personnel can be contacted while auger repair personnel can be contacted in the event of malfunction of the auger shaft.

Where necessary or desirable, the composting process can be promoted by a means for enabling an introduction of fluids, such as desired gasses or liquids, into the digestion chamber. That means can, by way of example, comprise a supply source in fluidic communication with at least one supply aperture disposed along the auger shaft. Alternatively or additionally, the means can comprise a supply source in fluidic communication with at least one supply aperture disposed along one or more mixing vanes.

One will appreciate that the foregoing discussion broadly outlines the more important features of the invention to enable a better understanding of the detailed description that follows and to instill a better appreciation of the inventors' contribution to the art. Before any particular embodiment or aspect thereof is explained in detail, it must be made clear that the following details of construction, descriptions of hardware and software designs, and illustrations of inventive concepts are mere examples of the many possible manifestations of the invention.

DETAILED DESCRIPTION OF PREFERRED EMBODIMENTS

As is the case with many inventions, the present invention for an automated composting system is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
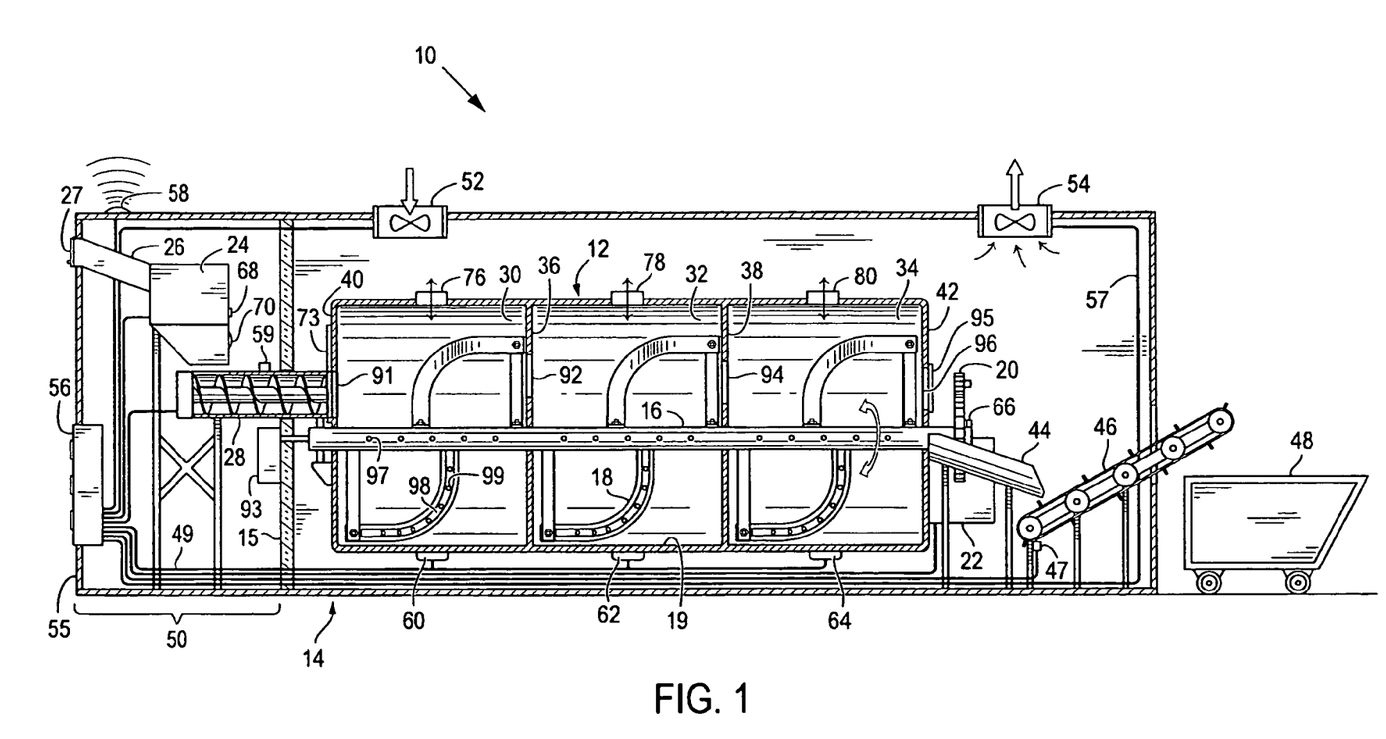
FIG. 1 is a sectioned view in side elevation of a composting system according to the present invention.

Looking more particularly to the drawings, a first preferred embodiment of the present invention for an automated composting system is indicated generally at 10 in FIG. 1. There, the composting system 10 is founded on a digestion chamber 12 that is retained in a stationary condition during operation of the composting system 10. In this case, the digestion chamber 12 is disposed within a larger shell housing 14 along with certain other components of the composting system 10 as will be described herein. The digestion chamber 12 and the shell housing 14 certainly could be of a variety of configurations within the scope of the present invention. In this exemplary embodiment, the digestion chamber 12 can be generally cylindrical or elliptical in cross section with a first end wall 40 and a second end wall 42. The shell housing 14 can be generally rectangular in cross section such that the composting system 10 can be similar in size and shape to a box trailer. As such, the composting system 10, or at least the bulk of it, can be readily moved and transported.

In any event, the digestion chamber 12 is preferably divided into a plurality of digestion subchambers. In this case, the digestion chamber 12 is divided into a primary subchamber 30, a secondary subchamber 32, and a tertiary subchamber 34 by a first divider wall 36 and a second divider wall 38. Although the first and second divider walls 36 and 38 are shown as being generally evenly spaced such that the primary, secondary, and tertiary subchambers 30, 32, and 34 are substantially equal in volume, it may be preferable to space the first and second divider walls 36 and 38 and possibly further divider walls unequally such that the subchambers 30, 32, 34, and possibly further subchambers are of different volumes for accommodating the volumetric variations that become manifest during the composting process. The peripheral wall of the digestion chamber 12 and possibly the first and second end walls 40 and 42 and the first and second divider walls 36 and 38 can be thermally insulated if necessary or desirable to enable the inner volumes of the primary, secondary, and tertiary subchambers 30, 32, and 34 to be maintained in a desired temperature condition.

First, second, and third vents 76, 78, and 80, which can incorporate fans, are appropriately disposed in the peripheral wall of the digestion chamber 12 to allow or drive the ingress and egress of gases, such as air and composting byproducts, to and from the primary, secondary, and tertiary subchambers 30, 32, and 34 respectively. Similarly, first and second vents 52 and 54, which also can incorporate fans, are disposed in the shell housing 14 generally near the ends thereof for enabling gases to be provided to and vented from within the shell housing 14.

Still further, first, second, and third temperature sensors 60, 62, and 64 are coupled preferably to the bottom surface of the digestion chamber 12 in operable association with the primary, secondary, and tertiary subchambers 30, 32, and 34 respectively for monitoring the temperature of compost material disposed in the subchambers 30, 32, and 34. If necessary or desirable depending, for example, on ambient conditions, the temperature sensors 60, 62, and 64 could have heating elements operably associated therewith for adding heat to the composting system 10.

An auger shaft 16 is rotatably retained relative to the digestion chamber 12 extending through each of the primary, secondary, and tertiary subchambers 30, 32, and 34. During operation of the composting system 10, the shaft 16 can be intermittently or constantly rotated by a power unit or drive motor 22 most likely in combination with speed reduction and control gearing 20. The shaft 16 could be crafted to rotate as a unit. Alternatively, it could be subdivided to achieve selective rotation within one or more of the subchambers 30, 32, and/or 34.

Figure 3:
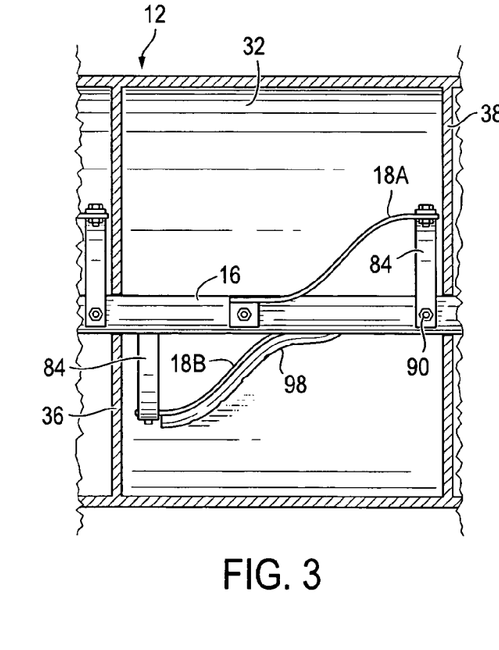
FIG. 3 is a sectioned plan view of a segment of the composting system.
Figure 4:
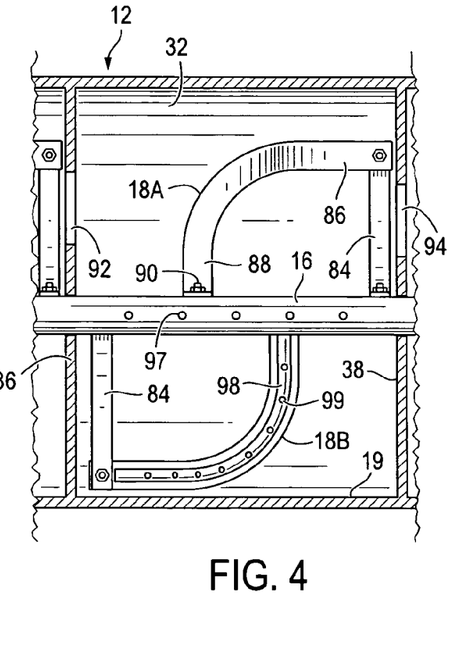
FIG. 4 is a sectioned view in side elevation of the segment of the composting system of FIG. 3.

At least one mixing vane 18 is fixed relative to the shaft 16 for rotation therewith in each of the subchambers 30, 32, and 34. As shown in FIGS. 1, 3, and 4, in the present embodiment, a first mixing vane 18A and a second mixing vane 18B are retained for rotation with the shaft 16. Each mixing vane 18A and 18B can be considered to have a proximal end that is fixed directly to the shaft 16, a distal end that is spaced a given radial distance from the shaft 16, and a body portion that spans the entire distance therebetween. Preferably, a radially projecting support member 84 stabilizes the distal end of each mixing vane 18A and 18B. Although the mixing vane 18A and 18B and the support member 84 could certainly be welded or otherwise fixed to one another and to the shaft 16, it presently appears more preferable to carry out the relative couplings with nut and bolt fasteners 90. With that, the mixing vane 18A and 18B and, if necessary, the support member 84 could be readily removed for repair or replacement.

Under certain constructions of the automated composting system 10, it may be desirable to introduce gasses, solids, and/or liquids into one or more of the subchambers 30, 32, and 34. For example, composting may be facilitated by the selective introduction of oxygen, nitrogen, and/or other gasses to the composting material. Furthermore, composting may be improved by additionally or alternatively adding or subtracting heat relative to the composting system 10 to maintain optimal operating temperatures. To facilitate such control, automated composting systems 10 according to the present invention can incorporate a supply source 93 for introducing desired materials and/or temperature variations to the digestion chamber 12. The supply source 93 can inject gasses, liquids, and/or other materials and/or temperature conditioned gasses into the digestion chamber 12 by use of the shaft 16, which can incorporate a plurality of shaft apertures 97 therein. The supply source 93 can also or alternatively introduce materials and/or temperature conditioned gasses into the digestion chamber by supply tubes 98 that traverse or are integrally formed with one or more of the mixing vanes 18A and 18B. The supply tubes 98 can have one or more supply tube apertures 99 therein.

As is best seen in the plan view of FIG. 3 and the elevational view of FIG. 4, the mixing vanes 18A and 18B can combine to traverse substantially the entire subchamber 30, 32, or 34 and will have mixing paths that overlap for at least a portion thereof. Each mixing vane 18A and 18B has a radial component 88 projecting generally away from the shaft 16 and an axial component 86 projecting in general alignment with the axis of the shaft 16. The mixing vanes 18A and 18B are contoured such that, together, they demonstrate a substantially continuous, sloped mixing surface that has a lead edge adjacent to the first divider wall 36 and a trailing edge adjacent to the second divider wall 38. Ideally, the mixing vanes 18A and 18B are dimensioned relative to the subchamber 30, 32, and 34 such that the axial components 86 just clear the arcuate bottom surface 19 of the subchamber 30, 32, or 34. Also, the mixing vanes 18A and 18B are preferably crafted with axial portions 86 that cooperate to provide a substantially constant, although staggered, mixing surface that is just slightly spaced from the arcuate bottom surface 19.

The digestion chamber 12 has an aperture 91 in the first end wall 40 for receiving waste material (not shown) into the primary subchamber 30. The first divider wall 36 has an aperture 92 therein for allowing waste material to be passed from the primary subchamber 30 to the secondary subchamber 32. Similarly, an aperture 94 in the second divider wall 38 allows material to pass from the secondary subchamber 30 to the tertiary subchamber 34. Finally, an aperture 96 in the second end wall 42 is provided to enable waste material to be emitted from the tertiary subchamber 34 and from the digestion chamber 12 in general.

The particular shape, location, and size of the apertures 91, 92, 94, and 96 could vary within the scope of the invention. For example, one or more of the apertures 91, 92, 94, and/or 96 could be generally round or elliptical and could be concentric with or disposed above, below, and/or lateral to the rotatable shaft 16. Alternatively, one or more of the apertures 91, 92, 94, and/or 96 could comprise slots removed from the walls 36, 38, 40, and/or 42. They could be disposed at similar heights or they could be disposed at different heights to accommodate the volumetric changes experienced during composting. In any event, one or more of the apertures 91, 92, 94, and/or 96 could be selectively closable, such as by a closure door 73 and a closure door 95 for insulating the subchambers 30, 32, and 34 from one another and/or from the exterior of the digestion chamber 12.

A shredding unit 24 is disposed within the shell housing 14 for shredding waste material into particles of reduced size to optimize the composting process. An input chute 26 interfaces with a first end panel 55 of the shell housing 14 for initially receiving material to be composted into the composting system 10 and feeding that material to the shredding unit 24. Waste material can be gravity fed along the input chute 26 and into the shredding unit 24. Alternatively or additionally, the waste material can be fed to the shredding unit 24 by a conveyor means, such as a belt, a screw arrangement, drive arms, or any other appropriate means. The shredding unit 24 can incorporate a safety switch such that it can become operative only when the safety of the operator can be verified, such as when a safety door 27 is fully closed. The shredding unit 24 and the components associated therewith are generally thermally insulated from the digestion chamber 12 by an insulated barrier wall 15, which also tends to insulate the shredding unit 24 and the associated components from the moisture inherent in the composting process. The barrier wall 15 subdivides the shell housing 14 into the digestion chamber 12 and a power and control compartment 50.

The shredding unit 24 could certainly be of a wide variety of types that each would be well within the scope of the present invention. With combined reference to FIGS. 1 and 2, one sees that the preferred shredding unit 24 in this embodiment has intermeshing, counter-rotating shredding shafts 72 with plural lobed cutters and hooked cutting blades for reducing waste material to appropriately sized particles. Such a construction can be operated with high-torque, low-angular-speed blade rotation to tear, cut, crush, and otherwise break down waste material while resisting jamming, kickback, and other potential performance issues.

Figure 2:
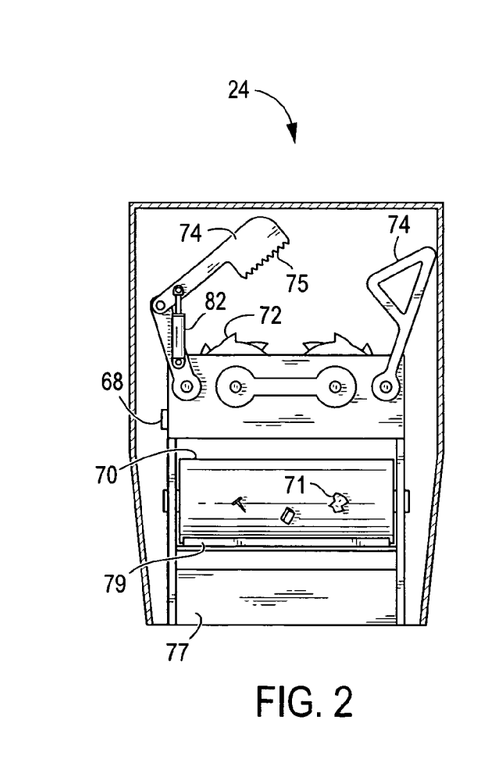
FIG. 2 is a view in front elevation of a shredding unit pursuant to the present invention.

The operation of the shredding unit 24 can be improved still further with the provision of one or more feed arms 74, which can be unitary or segmented as is shown in FIG. 2. Where the feed arm 74 is segmented, one or more hydraulic actuators 82 can be employed to control the operation of the feed arm 74. Each feed arm 74 has a serrated engaging portion 75 for ensuring positive, frictional contact with waste material. Under this arrangement, the feed arms 74 can be activated to tamp or otherwise drive waste material into the shredding shafts 72. This can be particularly advantageous where problematic waste material has been encountered and a re-feeding of the material into the shredding shafts 72 is necessary. With this, operator intervention and related downtime can be minimized. For example, where the shredding unit 24 has become jammed, the shredding shafts 72 can engage in a brief reverse rotation to dislodge the jammed material and the feed arms 74 can be employed to re-feed the material for further shredding.

The shredding unit 24 can further include a ferrous material separator for removing ferrous materials from the waste material stream since it is not subject to composting. In this embodiment, the ferrous material separator comprises one or more magnetized or magnetizable rotatable drums 70 interposed along the post-shredding waste stream. Under this arrangement, ferrous material, such as that indicated at 71, will tend to adhere to the rotatable drum 70 and, thereby, be prevented from entering the digestion chamber 12. A scraper 79 can be provided for scraping the retained ferrous material 71 from the rotatable drum 70. A bin 77 can be disposed below the scraper 79 and the rotatable drum 70 for catching and retaining the ferrous material 71. Of course, the ferrous material separator could take a number of alternative forms, such as an overhead magnet, a conveyor belt arrangement with a magnetized portion or an internal magnet arrangement, or any other suitable arrangement.

An input conveyor mechanism 28 is provided for advancing shredded waste material from the shredding unit 24, through the aperture 91 in the first end wall 40, and into the primary compartment 30 of the digestion chamber 12. Similarly, an output conveyor mechanism 44 is provided for advancing composted material that is ejected through the aperture 96 in the second end wall 42 of the digestion chamber 12. Finally, an exit conveyor mechanism 46 is operably associated with the conveyor mechanism 44 for passing composted material through the second end panel 57 of the shell housing 14 where it can be deposited in any appropriate way, such as into a receiving bin, a transportation vehicle, a storage bag, or any other receptacle 48. The particular type of conveyor mechanism can vary widely. As such, in each case, it could comprise a belt conveyor, a screw conveyor, a gravity-fed chute, or any other suitable conveying system. In this embodiment, the input conveyor mechanism 28 comprises a screw conveyor, the output conveyor mechanism 44 comprises a gravity-fed chute, and the exit conveyor mechanism 46 comprises a conveyor belt.

A control and monitoring system 56 is mounted to the first end panel 55 of the shell housing 14 and is operably associated with the components of the composting system 10 by, for example, wires 49. The control and monitoring system 56 enables the selective or automatic activation of the various components of the composting system 10, including the shredding unit 24; the rotatable drum 70; the conveyors 26, 28, 44, and 46; the motor 22 for powering the rotatable shaft 16; the vents 52, 54, 76, 78, and 80; and the temperature sensors 60, 62, and 64.

Advantageously, a plurality of operation and malfunction sensors are incorporated into the composting system 10 to enable a monitoring of the operational status of certain components of the composting system 10. More particularly, a shredder sensor 68 monitors the operation of the shredding unit 24 and can provide a report of any remediable or irremediable jamming or other malfunction of the shredding unit 24 to the control and monitoring system 56. Similarly, a shaft sensor 66 can provide an indication of any obstruction or other malfunction of the rotatable shaft 16 and its related components. Still further, an input conveyor sensor 59 can indicate whether the input conveyor 28 is operating properly, and an exit conveyor sensor 47 can indicate whether the exit conveyor mechanism 46 is operational. Of course, additional or fewer sensors might be provided in any particular composting system 10.

In an even further refinement, the control and monitoring system 56 can be operably associated with a communications unit 58. The communications unit 58 could be of any type that would be effective for communicating a malfunction report to a remotely located receiver. By way of example, it could comprise a landline or wireless modem arrangement that, in combination with a microprocessor unit within the control and monitoring system 56, could dial or otherwise contact a remotely located receiver to provide a notification regarding the malfunction. In any event, the communications unit 58 could further employ global positioning system technology for additionally reporting to the remotely located receiver the particular location of the composting system 10.

Further still, the control and monitoring system 56 and the communications unit 58 could cooperate to act as a means for automatically contacting a selected remotely located receiver depending on the malfunctioning system component. For example, where the malfunction comprises a breakage or jamming of the shredding unit 24, the monitoring system 56 and the communications unit 58 could automatically contact pre-selected repair personnel with the experience and ability necessary for remedying the malfunction of the shredding unit 24. Likewise, where the malfunction is in the rotatable shaft 16, the monitoring system 56 and the communications unit 58 can cooperate to make automatic contact with repair personnel that have been pre-selected as having the knowledge and ability required for immediately repairing the rotatable shaft 16. With this, the composting system 10 can ensure that malfunctions in the system 10 are remedied most efficiently, expeditiously, and reliably. With this, downtime and unnecessary damage to the components of the composting system 10 can be minimized without regard to the knowledge or degree of care of the operator and with minimal inconvenience to the operator.

So constructed, the composting system 10 can be employed in a wide variety of applications, both commercial and non-commercial, where organic waste is generated. For example, the composting system 10 can be used to great advantage relative to supermarkets, restaurants, schools, and sundry other locations. In operation, a composting cycle can begin with an operator feeding organic material to be composted into the input chute 26, which will guide it into the shredding unit 24. With the safety door 27 and any other safety mechanisms confirming the safety of the operator, the shredding unit 24 can be automatically or selectively induced into operation thereby reducing the compost material to a suitable particulate size. The shredded material will then spill over the rotatable drum 70 thereby removing ferrous material from the material stream. The waste material will then be transported into the primary subchamber 30 of the digestion chamber 12 by the conveyor mechanism 28.

Once in the primary subchamber 30, the waste material can intermix with any previously deposited waste material, and the composting process will begin. The rotatable shaft 16 with the mixing vanes 18 extending therefrom will be induced into operation during the shredding process and intermittently, such as one rotation per hour, one rotation each one and one-half hours, or the like, thereafter for creating a generally homogenous mixture of organic material. The composting process can thus be initiated, first with mesophyllic bacteria being primarily active. As the composting process continues, temperatures will increase to the thermophilic range and thermophilic bacteria will become operative.

With the consistent, intermittent operation of the rotatable shaft 16, the compost material will tend to be driven axially along the primary subchamber 30 by the mixing vanes 18. Eventually, the compost material will be propelled through the aperture 92 and into the secondary subchamber 32 where the more advanced and expeditious thermophilic stage of composting can continue. Simultaneously, the mixing vanes 18 will tend to drive material that is in the advanced stages of decomposition through the aperture 94 and into the tertiary subchamber 34. There, the final stages of composting, such as cooling, curing, and further mesophyllic and possibly thermophilic bacterial action, can take place. Advantageously, the periodic rotation of the shaft 16 and the mixing vanes 18, which by their construction contact all areas of the compost material with each revolution, ensures that the compost material is fully mixed and aerated in each of the subchambers 30, 32, and 34. Finally, with rotation of the rotatable shaft 16, fully composted material will be ejected through the aperture 96 and will be deposited into the output conveyor mechanism 44, which will advance it to the exit conveyor mechanism 46. In turn, the exit conveyor mechanism 46 will deposit the composted material into the receptacle 48, which can be employed to transport the composted material for distribution or other usage.

As composting progresses in each of the subchambers 30, 32, and 34, the temperature sensors 60, 62, and 64, the heating elements, and the vents 76, 78, and 80 can be employed in cooperation to ensure that the subchambers 30, 32, and 34 are maintained at ideal temperatures for their respective composting stages. For example, where thermophilic bacterial action should be expected to dominate, as is particularly the case in the secondary subchamber 32, the temperature should be maintained in the thermophilic range, which is typically considered to be between about 120 degrees Fahrenheit and 150 degrees Fahrenheit. Preferably, however, the thermophilic composting stage will be maintained at a temperature in excess of about 130 degrees Fahrenheit since such a temperature is known to destroy unwanted pathogens. Where mesophyllic bacterial action is desired, such as is most likely the case in the tertiary subchamber 34, mesophyllic temperatures, namely between about 70 degrees Fahrenheit to about 105 degrees Fahrenheit, should be maintained. If the temperatures fall significantly below desired ranges, the composting process can substantially cease or at a minimum become less efficient. Should temperatures significantly exceed desired ranges, particularly in excess of the thermophilic range, useful bacteria can be killed. Advantageously, such contingencies can be avoided by selective or automatic use of the temperature sensors 60, 62, and 64, the heating elements, and the vents 76, 78, and 80.

Advantageously, any malfunctions in the composting system 10 can be sensed by the monitoring system 56. Furthermore, any sensed malfunction, such as a jammed or broken shredding unit 24, can be reported not only to the operator but also to qualified repair personnel by use of the communications unit 58. With that, repair or other appropriate remediation can be undertaken in a most expedient manner. As a result, interruptions to the composting process and operator inconvenience can be minimized.

Figure 5:
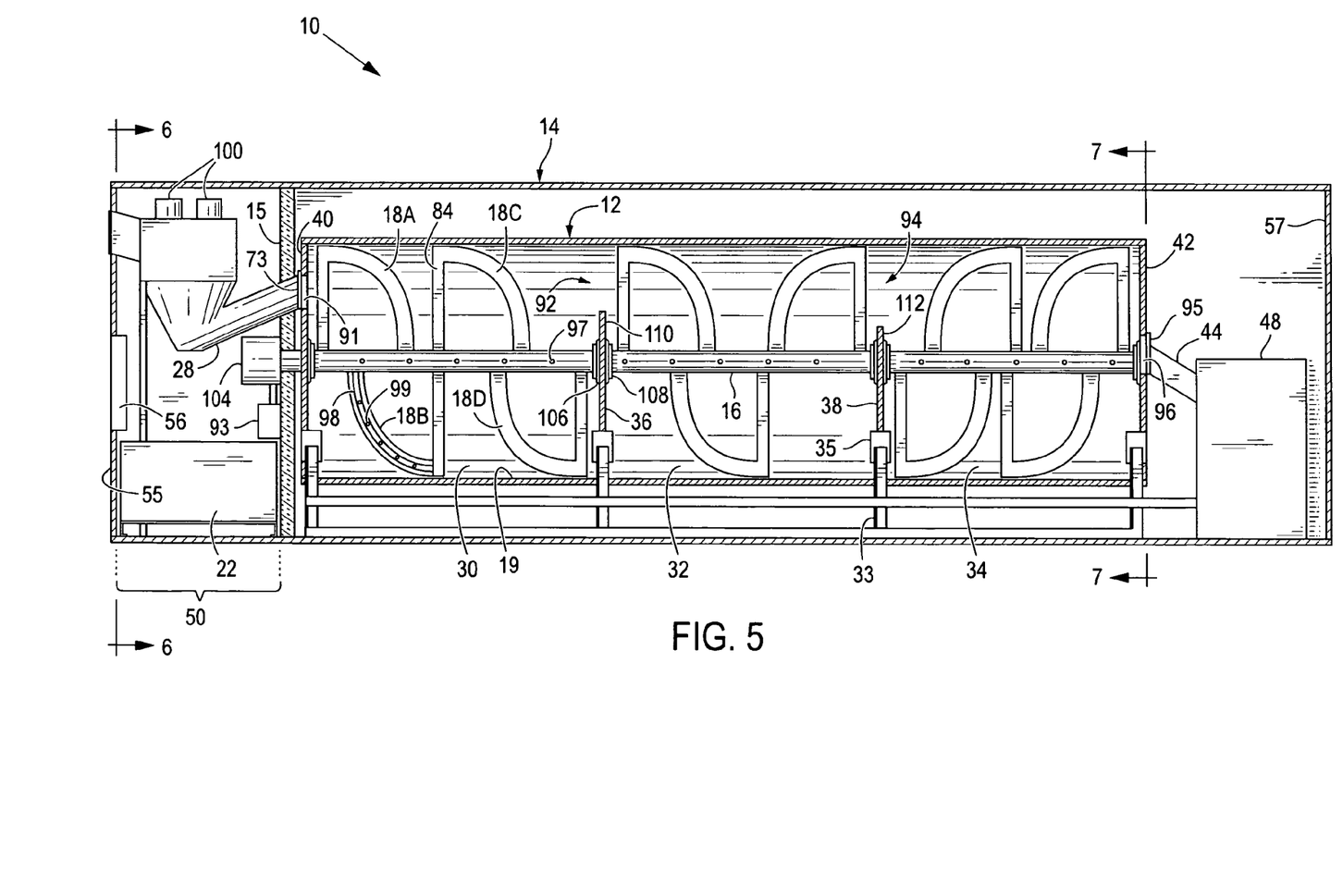
FIG. 5 is a sectioned view in side elevation of an alternative composting system pursuant to the present invention.
Figure 6:
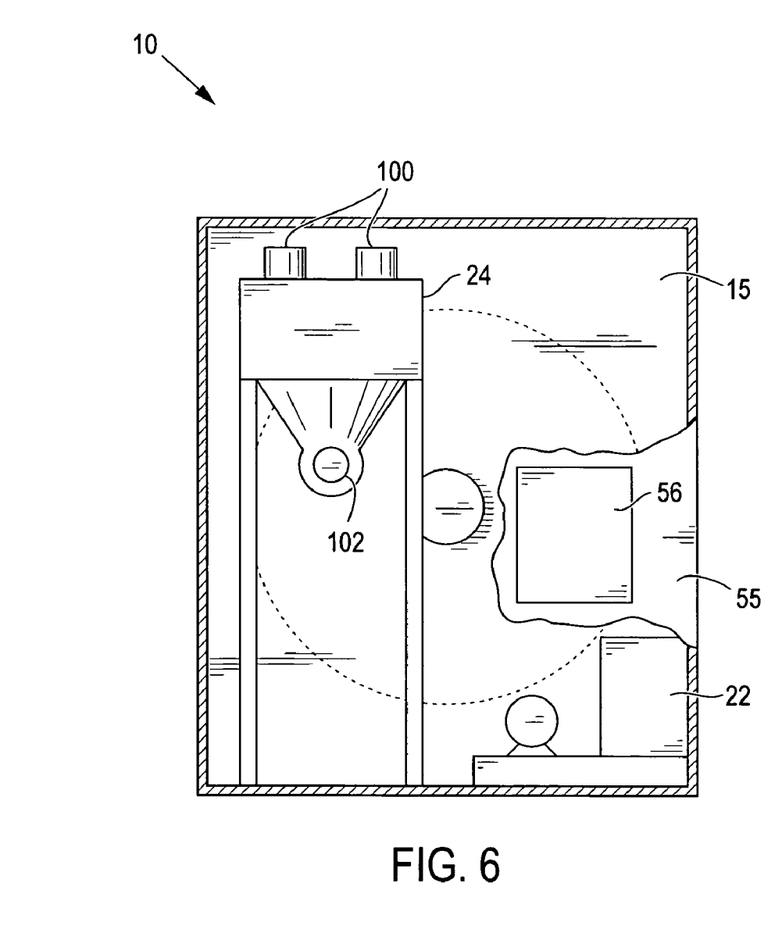
FIG. 6 is a view in front elevation of the composting system of FIG. 5.
Figure 7:
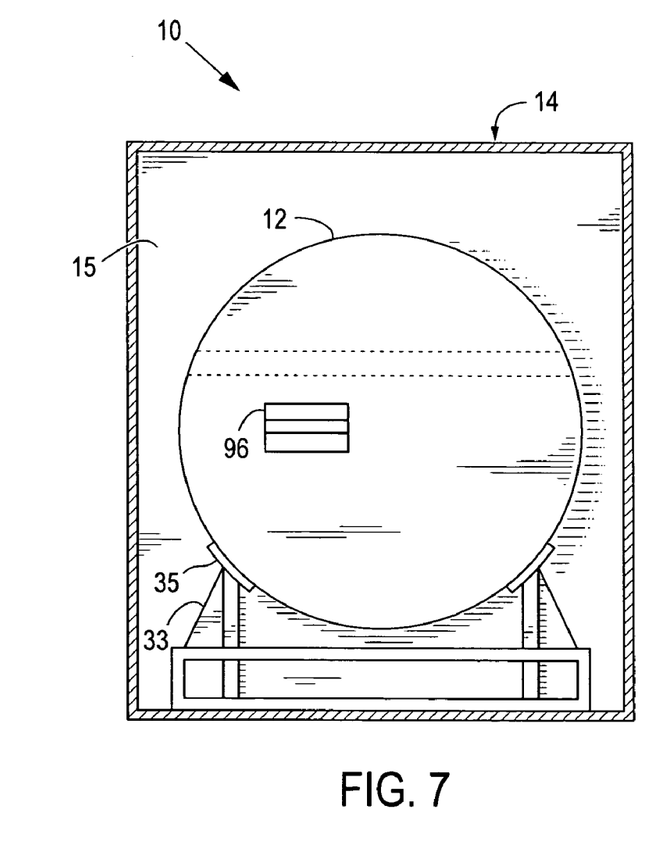
FIG. 7 is a view in rear elevation of the composting system of FIG. 5.

An alternative embodiment of an automated composting system 10 according to the present invention is depicted in FIGS. 5, 6, and 7. The composting system 10 is founded on a digestion chamber 12, which is generally cylindrical. The digestion chamber 12 is retained within a shell housing 14. In one example of the invention, the shell housing 14 can comprise a standardized shipping container, which can, for example, have a length of 40 feet. With this, the composting system 10 can be completely portable and readily mobile. The digestion chamber 12 can be formed of ¼ inch thick stock with a diameter of approximately 4 feet and a length of approximately 20 feet. The digestion chamber 12 can be supported relative to the shell housing 14 by a plurality of support gussets 35 in combination with a corresponding plurality of support pads 33 for spreading the supporting force provided by the support gussets 35.

Primary, secondary, and tertiary subchambers 30, 32, and 34 can be formed within the digestion chamber 12 by first and second divider walls 36 and 38. In this case, the first and second divider walls 36 and 38 extend only partially from the bottom to the top of the digestion chamber 12 whereby the first and second divider walls 36 and 38 terminate in first and second baffles 110 and 112 thereby leaving the apertures 92 and 94 between the subchambers 30 and 32 and 32 and 34. The first and second baffles and 112 can terminate at the same or different heights. In this embodiment, the first baffle 110 extends to a height less than that of the entry aperture 91 but greater than a height of the second baffle 112. The exit aperture 96 has a height that is less than the height of the second baffle 112. With this, compost material will tend to fill the subchambers 30, 32, and 34 and then move on to either the next subchamber 32 or 34 or out of the digestion chamber 12 through the exit aperture 96. In this embodiment, compost material passing through the exit aperture 96 falls into a receptacle 48 through an output conveyor mechanism 44, which simply comprises an exhaust chute. As such, no power need be disposed at the exhaust end of the composting system 10.

An auger shaft 16, which can be formed by a 6-inch diameter pipe with a ⅜ inch wall thickness, has pipe flanges 106 disposed therealong and is rotatably supported by flange bearings 108. The auger shaft 16 can be turned by a hydraulic auger motor 104. As is shown relative to the primary subchamber 30, the auger shaft 16 can have first, second, third, and fourth mixing vanes 18A, 18B, 18C, and 18D extending therefrom for mixing and advancing compost material. Each of the mixing vanes 18A, 18B, 18C, and 18D can be stabilized by a support member 84.

A shredding unit 24 is again provided for reducing the particle size of material to be composted. In this embodiment, the shredding unit 24 is powered by hydraulic shredder motors 100. Material processed by the shredding unit 24 is advanced through the entry aperture 91 and into the primary subchamber 30 by an input conveyor mechanism 28, which in this embodiment comprises an auger conveyor, which is also indicated at 28. The auger conveyor 28 is powered by a hydraulic conveyor motor 102 as is shown best in FIG. 6. A control and monitoring system 56 is again retained relative to the first end panel 55 of the shell housing 14 for enabling controlled and automated operation of the composting system 10.

Under the present embodiment, the hydraulic shredder motors 100, hydraulic conveyor motor 102, and the hydraulic auger motor 104 can all be powered by a single hydraulic power unit 22. Advantageously, under such a construction, all power and control mechanisms of the composting system 10 can be disposed at a single end of the composting system 10, namely to the power and control compartment 50 side of the barrier wall 15. With this, construction, maintenance, repair, and operation of the composting system 10 are rendered more convenient and more efficient. Furthermore, by employing hydraulics to control and operate the input conveyor mechanism 28, the shredding unit 24, and the auger shaft 16, the control and power system of the composting system 10 is notably simpler, more compact, and more durable than the arrangements of the prior art.

Figure 8:
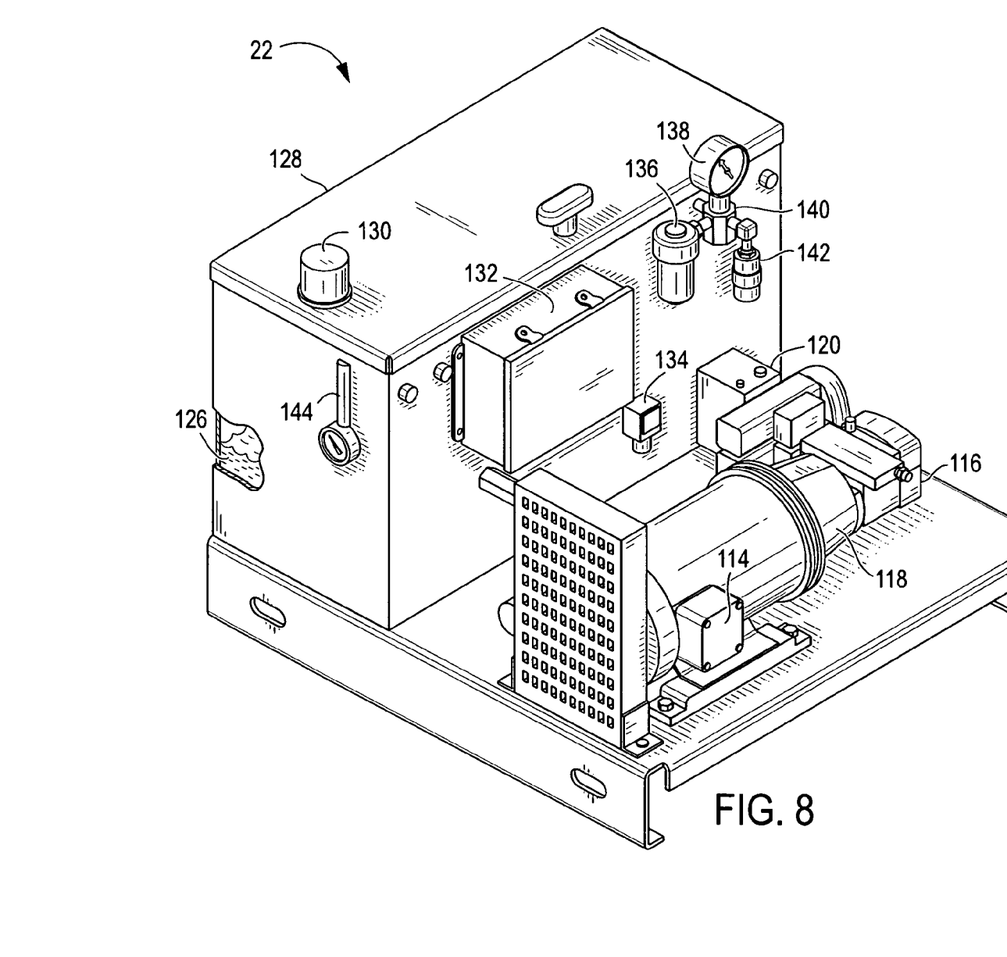
FIG. 8 is a perspective view of a hydraulic power unit under the present invention.
Figure 9:
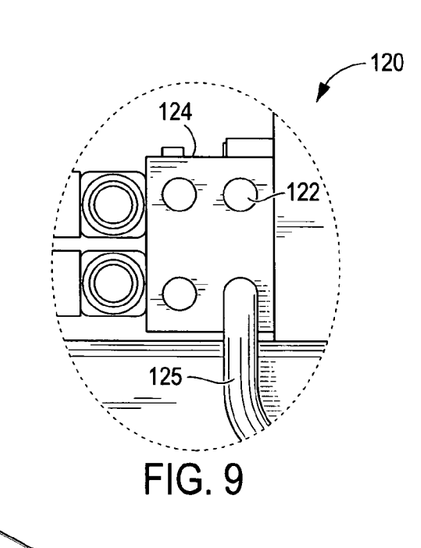
FIG. 9 is a view in front elevation of a hydraulic connection arrangement for the hydraulic power unit of FIG. 8.

A hydraulic power unit 22 according to the present invention is depicted in FIG. 8. The hydraulic power unit 22 has a motor 114 operably coupled to a pump 116 for providing power thereto by a pump/motor adapter 118. A hydraulic coupling unit 120, which is shown alone in FIG. 9, enables a hydraulic coupling of the hydraulic power unit 22 to the hydraulic shredder motors 100, the hydraulic conveyor motor 102, and the hydraulic auger motor 104 by means of hydraulic connections 122 retained relative to a hydraulic manifold 124 and hydraulic hoses, such as that indicated at 125 in FIG. 9.

Hydraulic fluid 126 is maintained in a reservoir 128 for enabling a transmission of hydraulic power. A breather filler cap 130 is operably associated with the reservoir 128. A power supply 132 is retained relative to the power unit 22, and a pump controller 134 provides control to the entire power unit 22 including the power unit 22 and the motor 114. A fluid level and temperature gauge 144 is operably coupled to the reservoir 128. A filter 136 provides for filtration of the hydraulic fluid 126 while a pressure gauge 138, a transducer 142, and a relief valve 140 cooperate to maintain proper fluid pressure.

With certain details of the present invention for an automated composting system 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventors. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

We claim as deserving the protection of United States Letters Patent:

1. A composting system for facilitating a decomposition of organic material, the composting system comprising:
   a digestion chamber with an input aperture for receiving organic material to be composted, a body portion, and an exhaust aperture for enabling an exhaust of composted organic material from the digestion chamber;
   an auger shaft with a body portion rotatably retained within the digestion chamber;
   at least one mixing vane retained relative to the auger shaft for mixing organic material within the digestion chamber;
   a means for inducing a rotation of the auger shaft;
   at least first and second divider walls that divide the digestion chamber into at least primary, secondary, and tertiary subchambers wherein the input aperture is in communication with the primary subchamber, wherein the exhaust aperture is in communication with the tertiary subchamber, wherein a first intermediate aperture is disposed in the first divider wall for enabling a passage of organic material from the primary subchamber into the secondary subchamber, and wherein a second intermediate aperture is disposed in the second divider wall for enabling a passage of organic material from the secondary subchamber into the tertiary subchamber wherein the input aperture, the first intermediate aperture, the second intermediate aperture, and the exhaust aperture sequentially decrease in effective height whereby organic material will tend to pass from the primary subchamber into the secondary subchamber, from the secondary subchamber into the tertiary subchamber, and from the tertiary subchamber through the exhaust aperture in response to a rotation of the auger shaft and a concomitant rotation of the at least one mixing vane.

2. The composting system of claim 1 wherein the means for inducing a rotation of the auger shaft comprises a hydraulic power unit.

3. The composting system of claim 2 wherein the means for inducing a rotation of the auger shaft further comprises a hydraulic auger motor wherein the hydraulic auger motor is hydraulically powered by the hydraulic power unit.

4. The composting system of claim 3 further comprising a hydraulic shredding unit with a hydraulic shredding motor for shredding organic material wherein the hydraulic shredding motor is hydraulically powered by the hydraulic power unit.

5. The composting system of claim 4 further comprising a hydraulic input conveyor mechanism with a hydraulic input conveyor motor for conveying organic material from the hydraulic shredding unit to the digestion chamber wherein the hydraulic input conveyor motor is hydraulically powered by the hydraulic power unit.

6. The composting system of claim 5 wherein the digestion chamber has an input end and an output end and wherein the hydraulic power unit, the hydraulic auger motor, the hydraulic shredding unit, the hydraulic shredding motor, the hydraulic input conveyor mechanism, and the hydraulic input conveyor motor are disposed adjacent to the input end of the digestion chamber.

7. The composting system of claim 6 further comprising a control system for controlling the operation of the hydraulic power unit, the hydraulic auger motor, the hydraulic shredding unit, the hydraulic shredding motor, the hydraulic input conveyor mechanism, and the hydraulic input conveyor motor.

8. A composting system for facilitating a decomposition of organic material, the composting system comprising:
   a digestion chamber with an input aperture for receiving organic material to be composted, a body portion, and an exhaust aperture for enabling an exhaust of composted organic material from the digestion chamber;
   an auger shaft with a body portion rotatably retained within the digestion chamber;
   at least one mixing vane retained relative to the auger shaft for mixing organic material within the digestion chamber;
   a means for inducing a rotation of the auger shaft;
   wherein the digestion chamber is subdivided into a plurality of subchambers by at least one divider wall wherein the auger shaft is disposed through each of the plurality of subchambers;
   at least one malfunction sensor for sensing a malfunction of the composting system; and
   a temperature sensor operably coupled with at least one of the subchambers and a heating element operably associated with the subchamber relative to which the temperature sensor is coupled whereby that subchamber can be maintained in a desired temperature condition.

9. The composting system of claim 8 wherein there are at least first and second divider walls that divide the digestion chamber into at least primary, secondary, and tertiary subchambers wherein the input aperture is in communication with the primary subchamber, wherein the exhaust aperture is in communication with the tertiary subchamber, wherein a first intermediate aperture is disposed in the first divider wall for enabling a passage of organic material from the primary subchamber into the secondary subchamber, and wherein a second intermediate aperture is disposed in the second divider wall for enabling a passage of organic material from the secondary subchamber into the tertiary subchamber.

10. The composting system of claim 1 wherein at least one mixing vane is retained relative to the auger shaft relative to each subchamber.

11. The composting system of claim 10 wherein the digestion chamber is generally annular in cross section and wherein plural mixing vanes are retained relative to the auger shaft relative to each subchamber and wherein the plural mixing vanes retained relative to each subchamber have axial portions that pass immediately adjacent to a lower portion of an inner wall surface of the digestion chamber and that cooperate to provide a substantially constant axial mixing surface immediately adjacent to the lower portion of the inner wall surface of the digestion chamber over an entire length of the respective subchamber.

12. The composting system of claim 1 wherein the first and second divider walls traverse entirely across an entire open inner volume of the digestion chamber and further comprising at least one separate vent operably coupled to each of the subchambers for enabling an ingress or egress of gasses relative to the subchamber.

13. The composting system of claim 12 further comprising a fan operably coupled to each vent.

14. A composting system for facilitating a decomposition of organic material, the composting system comprising:
    a digestion chamber with an input aperture for receiving organic material to be composted, a body portion, and an exhaust aperture for enabling an exhaust of composted organic material from the digestion chamber;
    an auger shaft with a body portion rotatably retained within the digestion chamber;
    at least one mixing vane retained relative to the auger shaft for mixing organic material within the digestion chamber;
    a means for inducing a rotation of the auger shaft;
    wherein the digestion chamber is subdivided into a plurality of subchambers by at least one divider wall wherein the auger shaft is disposed through each of the plurality of subchambers;
    at least one malfunction sensor for sensing a malfunction of the composting system; and
    a malfunction sensor is operably coupled to the auger shaft for sensing a malfunction of the auger shaft.

15. A composting system for facilitating a decomposition of organic material, the composting system comprising:
    a digestion chamber with an input aperture for receiving organic material to be composted, a body portion, and an exhaust aperture for enabling an exhaust of composted organic material from the digestion chamber;
    an auger shaft with a body portion rotatably retained within the digestion chamber;
    at least one mixing vane retained relative to the auger shaft for mixing organic material within the digestion chamber;
    a means for inducing a rotation of the auger shaft;
    wherein the digestion chamber is subdivided into a plurality of subchambers by at least one divider wall wherein the auger shaft is disposed through each of the plurality of subchambers;
    at least one malfunction sensor for sensing a malfunction of the composting system; and
    a shredding unit for shredding organic material wherein a malfunction sensor is operably coupled to the shredding unit for sensing a malfunction of the shredding unit.

16. A composting system for facilitating a decomposition of organic material, the composting system comprising:
    a digestion chamber with an input aperture for receiving organic material to be composted, a body portion, and an exhaust aperture for enabling an exhaust of composted organic material from the digestion chamber;
    an auger shaft with a body portion rotatable retained within the digestion chamber;
    at least one mixing vane retained relative to the auger shaft for mixing organic material within the digestion chamber;
    a means for inducing a rotation of the auger shaft;
    wherein the digestion chamber is subdivided into a plurality of subchambers by at least one divider wall wherein the auger shaft is disposed through each of the plurality of subchambers;
    at least one malfunction sensor for sensing a malfunction of the composting system; and
    a means for communicating a malfunction report from the composting system to a remotely located receiver that is physically displaced from the composting system.

17. The composting system of claim 16 wherein the means for communicating a malfunction report comprises a communications unit and wherein the communications unit further comprises a means employing global positioning system technology for enabling a reporting a location of the composting system.

18. The composting system of claim 16 wherein the means for communicating a malfunction report comprises a means for communicating a malfunction report to a remotely located receiver depending on a type of malfunction of the composting system.

19. A composting system for facilitating a decomposition of organic material, the composting system comprising:
    a digestion chamber with an input aperture for receiving organic material to be composted, a body portion, and an exhaust aperture for enabling an exhaust of composted organic material from the digestion chamber;
    an auger shaft with a body portion rotatably retained within the digestion chamber;
    at least one mixing vane retained relative to the auger shaft for mixing organic material within the digestion chamber;
    a means for inducing a rotation of the auger shaft;
    wherein the digestion chamber is subdivided into a plurality of subchambers by at least one divider wall wherein the auger shaft is disposed through each of the plurality of subchambers; and
    a means for enabling an introduction of fluids into the digestion chamber comprising a supply source in fluidic communication with at least one supply aperture disposed along the auger shaft or the at least one mixing vane.

20. The composting system of claim 1 wherein the means for inducing a rotation of the auger shaft comprises a power unit and further comprising a shell housing wherein the digestion chamber and the power unit are disposed in the shell housing.

21. The composting system of claim 20 further comprising a barrier wall disposed between the digestion chamber and the power unit.

22. The composting system of claim 1 further comprising a shredding unit for shredding organic material prior to a receipt of the organic material into the digestion chamber.

23. The composting system of claim 22 wherein the shredding unit comprises intermeshed, counter-rotating shredding shafts and a ferrous material separator disposed to receive material shredded by the shredding shafts for separating ferrous material from organic material prior to a receipt of the organic material into the digestion chamber.

24. The composting system of claim 23 wherein the ferrous material separator comprises a rotatable magnetic drum in combination with a scraper for scraping the ferrous material from the rotatable magnetic drum.

25. The composting system of claim 23 wherein the shredding unit further comprises at least one feed arm for inducing organic material into contact with the shredding shafts for shredding.

26. A composting system facilitating a decomposition of organic material, the composting system comprising:
- a shell housing with a first end, a second end, and an open inner volume;
- a digestion chamber fixed within the open inner volume of the shell housing wherein the digestion chamber has an input end and an output end and wherein the digestion chamber is subdivided into a plurality of subchambers by at least one divider wall;
- an input aperture disposed adjacent to the input end of the digestion chamber for receiving organic material to be composted;
- an exhaust aperture adjacent to the output end of the digestion chamber for enabling an exhaust of composted organic material from the digestion chamber;
- an intermediate aperture disposed in the at least one divider wall for enabling a passage of organic material from subchamber to subchamber;
- an auger shaft with a body portion rotatably retained within the digestion chamber wherein the auger shaft traverses from adjacent to the input end of the digestion chamber to adjacent to the output end of the digestion chamber;
- at least one mixing vane retained relative to the auger shaft relative to each subchamber of the digestion chamber for mixing organic material within the digestion chamber;
- means for inducing a rotation of the auger shaft;
- a shredding unit retained relative to the shell housing for shredding organic material;
- means for powering the shredding unit; and
- at least one malfunction sensor for sensing a malfunction of the auger shaft;
- wherein the shredding unit the means for inducing a rotation of the auger shaft, and the means for powering the shredding unit are disposed adjacent to the input end of the digestion chamber and further comprising a barrier wall disposed within the shell housing wherein the shredding unit, the means for inducing a rotation of the auger shaft, and the means for powering the shredding unit are disposed to a first side of the barrier wall and wherein the digestion chamber is disposed to a second side of the barrier wall.

27. The composting system of claim 26 wherein the means for inducing a rotation of the auger shaft and the means for powering the shredding unit comprise a single power unit.

28. The composting system of claim 27 wherein the single power unit comprises a hydraulic power unit.

29. The composting system of claim 28 further comprising a hydraulic input conveyor mechanism with a hydraulic input conveyor motor for conveying organic material from the hydraulic shredding unit to the digestion chamber wherein the hydraulic input conveyor motor is hydraulically powered by the hydraulic power unit.

30. The composting system of claim 26 wherein first and second divider walls traverse entirely across an entire open inner volume of the digestion chamber and further comprising at least one separate vent operably coupled to each of the subchambers for enabling an ingress or egress of gasses relative to the subchamber.

31. The composting system of claim 26 further comprising a means for communicating a malfunction report from the composting system to a remotely located receiver that is physically displaced from the composting system.

32. The composting system of claim 31 wherein the means for communicating a malfunction report comprises a communications unit and wherein the communications unit further comprises a means employing global positioning system technology for determining and enabling a reporting a location of the composting system.

33. The composting system of claim 32 wherein the means for communicating a malfunction report comprises a means for communicating a malfunction report to a remotely located receiver depending on a type of malfunction of the composting system.

34. The composting system of claim 26 further comprising a means for enabling an introduction of fluids into the digestion chamber whereby selected fluids can be introduced into the digestion chamber to facilitate composting wherein the means for enabling an introduction of fluids comprises a supply source in fluidic communication with at least one supply aperture disposed along the auger shaft or the at least one mixing vane.

* * * * *